Jan. 25, 1944. P. M. McHUGH ET AL 2,340,132
LIQUID CLARIFICATION
Filed June 4, 1940  3 Sheets-Sheet 1

INVENTORS
PHILIP M. McHUGH
WILLIAM C. WEBER
BY
John E. Hubbell
ATTORNEY

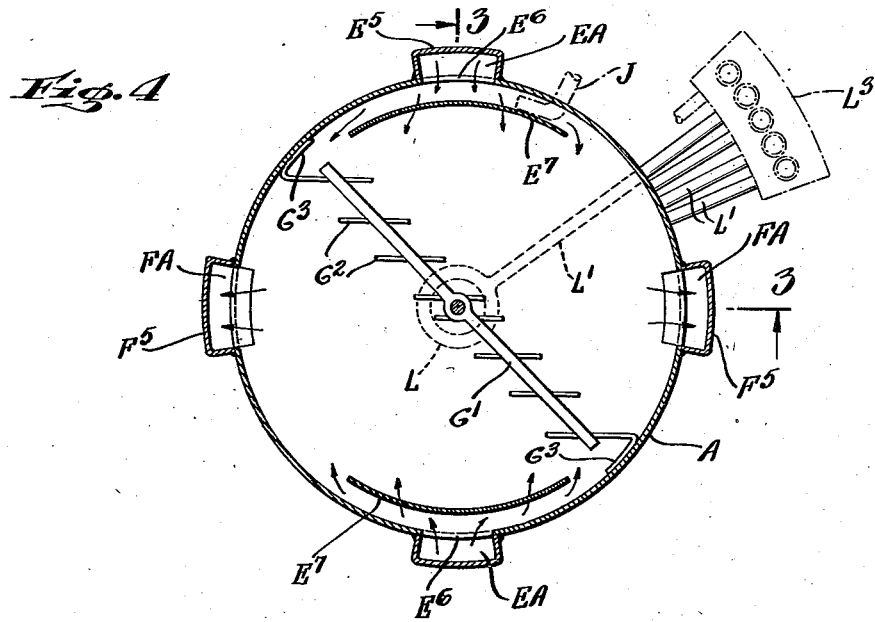
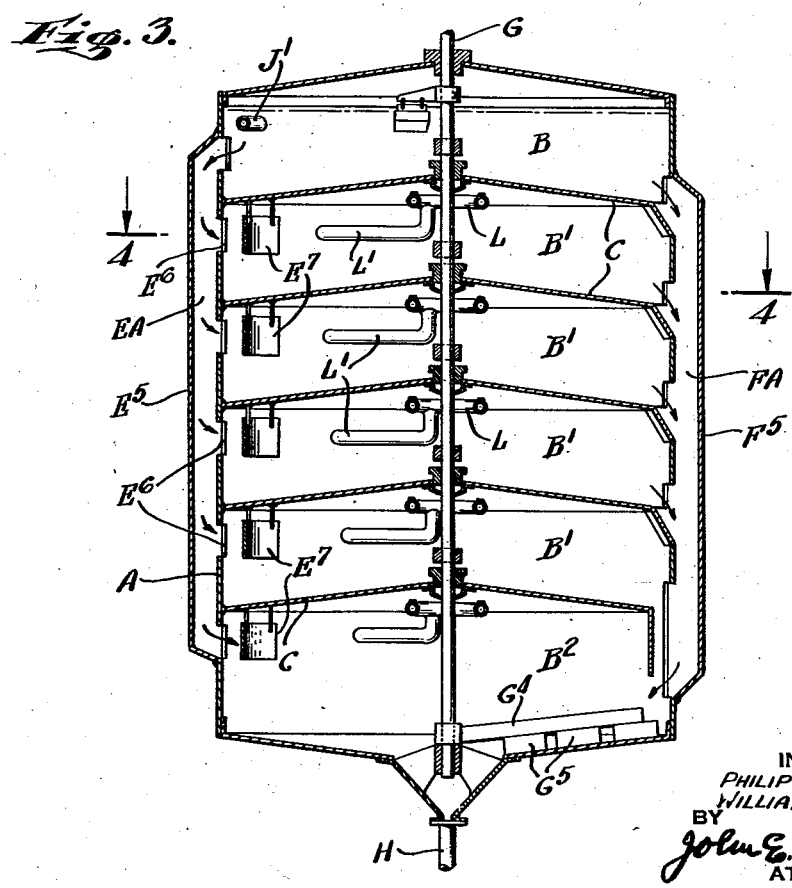

Jan. 25, 1944.   P. M. McHUGH ET AL   2,340,132
LIQUID CLARIFICATION
Filed June 4, 1940   3 Sheets-Sheet 3

INVENTORS
PHILIP M. McHUGH
WILLIAM C. WEBER
BY John E. Hubbell
ATTORNEY

Patented Jan. 25, 1944

2,340,132

UNITED STATES PATENT OFFICE 2,340,132

LIQUID CLARIFICATION

Philip M. McHugh, New York, N. Y., and William C. Weber, Westport, Conn., assignors to The Dorr Company, New York, N. Y., a corporation of Delaware Application June 4, 1940, Serial No. 338,674

16 Claims. (Cl. 210—55)

The present invention relates to clarifying or thickening apparatus of the multitray type used in the sedimentation of solids suspended in liquids and the separate removal of the clarified liquid and the sedimented solids, the latter being hereinafter called mud. The invention is especially well adapted for use in the clarification of juices and liquids incident to the manufacture of cane and beet sugar, but is well adapted also for other uses.

General objects of the present invention are to provide improved clarifying apparatus of the type specified, and to provide an improved method of clarifying liquids in such apparatus.

A more specific object of the invention is to provide a multitray clarifier with novel provisions for feeding liquid to be clarified to different superposed clarifying compartments along flow paths of amply large cross section, and for discharging mud from the different compartments along flow paths separate from the feed flow paths.

In preferred forms of the invention, the feed supply and mud withdrawal channels communicate with the clarifying compartments at the peripheries of the latter, and in horizontal cross section each of said channels is in the shape of an arc, or segment of an annulus. In an especially preferred construction, the superposed clarifying compartments are surrounded by an annular space which is divided by radial partitions into a series of feed channels distributed about the axis of the clarifier, and a series of mud channels also distributed about the clarifier axis.

The provision of separate vertical feed and mud discharge channels for the different superposed clarifying compartments, and the side by side arrangement of said channels along the peripheries of the clarifying compartments, permits of more efficient use of each of a considerable number of superposed clarifying compartments than has been practically possible heretofore.

Moreover, when the uppermost compartment of the multitray clarifier is used as a conditioning, or flocculating compartment, the described arrangements of the separate feed and mud removal flow paths makes it possible for the flocculated liquid to pass from the flocculating chamber to the different subjacent clarifying compartments along flow paths sufficiently short and direct, and sufficiently large in cross section, to avoid the significant floc disintegration which occurs when the flow paths are not short and direct and are not large enough to avoid objectionably high flow velocities. The invention thus makes it possible to realize, with relatively simple and inexpensive apparatus the full advantages of efficient flocculation of the liquid, prior to its introduction into the sedimentation or clarifying compartments.

Another and important object of the invention is to provide flow paths for the withdrawal of mud from the different superposed clarifying compartments, which are separate and so disposed as to permit of the discharge of muds of substantially the same densities from the different clarifying compartments.

In the preferred practical form of apparatus for attaining the last mentioned object of the invention, the mud discharge channels of different superposed clarifying compartments, lead down from the latter into the lower portion of the lower compartment, which serves as a mud thickening space, into which they open at such different levels, that the discharge outlet of each is sealed, in effect, by a mud strata of the density needed to maintain approximately the hydrostatic pressure at the upper mud inlet to the channel, required for the maintenance of the desired mud density at said inlet. To obtain this result the level of the mud discharge into the mud thickening space at which the mud channel from an upper clarifying compartment opens must be higher or lower accordingly as the last mentioned compartment is at a lesser or greater distance above said mud thickening space.

The statements just made find their explanation in the fact that the density of the mud in the mud thickening portion of the lower compartment is greater at a lower level than at a higher level, and its average density is considerably higher than the density of the mud in the mud discharge channels. Preferably, our improved apparatus includes provisions for adjusting the levels at which the separate mud channels from the different clarifying compartments open to the mud thickening compartment.

In the ordinary practice of our invention, the different superposed clarifying compartments are fed by gravitational flow from a common flocculating compartment, or feed reservoir, and the withdrawal of clarified liquid from each clarifying compartment is effected by the usual regulable drawoff means individual to the compartment. In the operation of a clarifier having such clarified liquid withdrawal and feed arrangements, the regulation of the level at which the individual mud discharge channel of a clarifying compartment opens into the mud thickening space not only regulates the density of the mud withdrawn from that compartment, but also modifies the rate of feed to the compartment which is primarily controlled by adjustment of the clarified liquid drawoff means. The conjoint use of the different above mentioned features of the invention thus make it possible to maintain similar clarifying conditions and to clarify similar amounts of liquid in each of a large number of superposed clarifying compartments. Such uniformity in the clarifying effects or capacities of the different superposed clarifying compartments is not obtainable with any prior multitray clarifier known to us.

The various features of novelty which characterize our invention are pointed out with particularity in the claims annexed to and forming a part of thsi specification. For a better understanding of the invention, however, its advantages, and specific objects attained with its use, reference should be had to the accompanying drawings and descriptive matter in which we have illustrated and described preferred embodiments of the invention.

Of the drawings:

Fig. 3 is a somewhat diagrammatic vertical section of a second form of our improved clarifier unit, the section being taken on the broken line 3—3 of Fig. 4;

Fig. 4 is a plan section on the line 4—4 of Fig. 3;

Fig. 5 is a sectional elevation taken on the broken line 5—5 of Fig. 6 illustrating another modification; and Fig. 6 is a partial plan section taken on the line 6—6 of Fig. 5.

Figure 2:
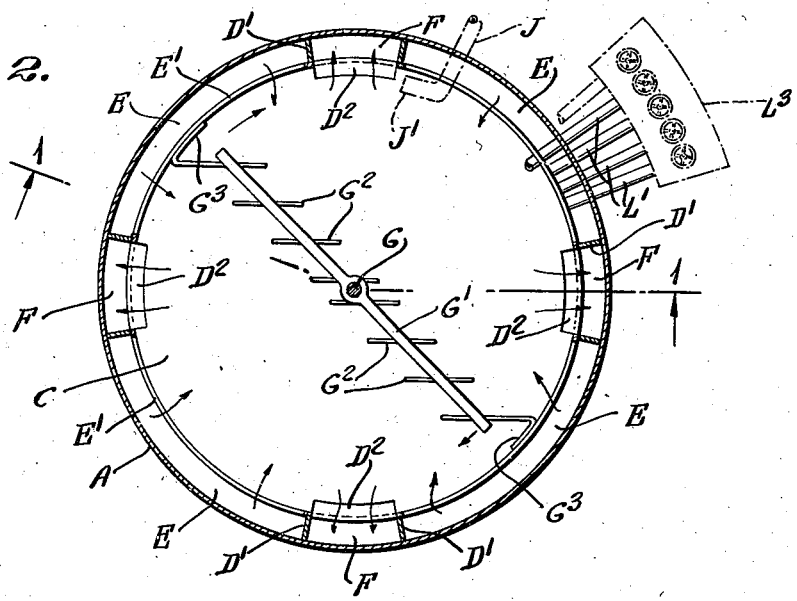
Fig. 2 is a plan section on the broken line 2—2 of Fig. 1.
Figure 1:
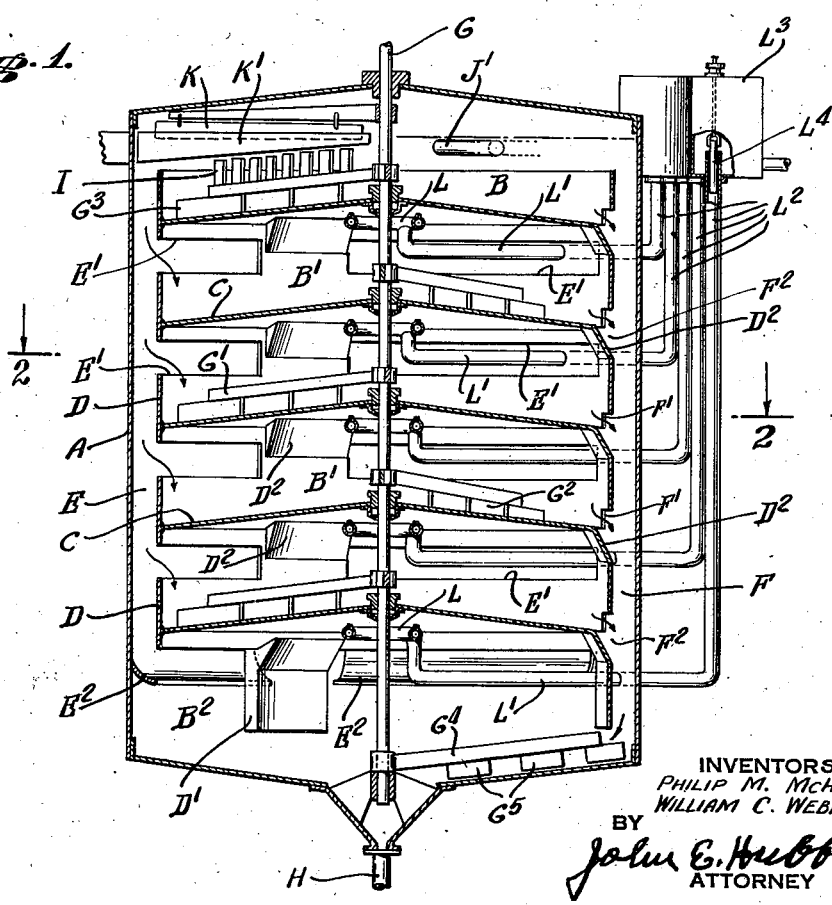
Fig. 1 is a somewhat diagrammatic vertical section of one form of our improved clarifier unit, the section being taken on the broken line 1—1 of Fig. 2.

In the drawings and referring first to the construction shown in Figs. 1 and 2, A represents a clarifier tank of conventional form divided by internal partitions C and D into an upper feed and conditioning chamber of compartment B, a plurality of intermediate clarifying compartments B', and a bottom clarifying and mud discharge compartment $B^2$. The intermediate compartments B' may be all alike in form and proportions. Each of the different compartments B and B' is separated from the immediately subjacent compartment by a tray C, which is slightly conical with its center above its periphery. Each of the trays C is connected at its periphery to a cylindrical partition wall D which is concentric with, but of smaller diameter than the tank A. The bottom wall of the tank A is slightly conical with its center lower than its periphery.

The annular space between the partition D and the cylindrical wall of the vertical tank is divided by radial partition walls D' to form vertical, arcuate feed channels E, and mud or sludge channels F. As shown, there are four feed channels E alternating about the axis with four sludge channels F. The latter may well be smaller in angular extent than the feed channels, and as shown, each feed channel E extends angularly about the tank axis for nearly 70°, and the angular extent of each sludge channel F is a little more than 20°.

Each feed channel E opens at its upper end to the compartment B above the top of the wall D, which extends a few inches above the peripheral portion of the bottom wall of the compartment B. Each feed channel opens to each of the compartments B' through feed inlet ports in the partition D. Each feed channel may thus communicate with each of the compartments B' through a single port E' of approximately the same angular extent as the feed channel, or through a series of smaller feed ports. Each of the ports E' opens to the corresponding compartment B' somewhat below its roof but appreciably nearer to its roof than to its bottom wall. Each feed channel opens at its lower end into the bottom clarifying compartment $B^2$ adjacent the roof of the latter. As shown, a projection $E^2$ from the tank wall below each feed channel E deflects the feed through the channel into the compartment $B^2$ toward the center of the latter.

Each mud channel F communicates with each of the compartments B and B', through a mud outlet port F' formed in the wall D immediately above the peripheral portion of the tray C forming the bottom wall of the compartment. Advantageously, and as shown, the portion $D^2$ of the partition wall D immediately beneath each mud outlet port F' is inclined toward the tank axis and the peripheral portion of the adjacent tray C is correspondingly notched to provide an enlargement $F^2$ of the channel F into which the port F'' opens. As shown also, each wall portion $D^2$ is an integral extension of the sheet metal piece constituting the tray immediately above said portion. As indicated in the drawings and as is now customary in the art, the tank structures illustrated herein are formed of metal plate parts welded together.

The different trays C are formed with central apertures for the passage of a vertical scraper shaft G axially disposed in the tank A. Known provisions may be employed to prevent leakage through said apertures. The shaft G extends through the tank top wall for engagement with driving mechanism adapted to slowly rotate the scraper shaft at the rate, for example, of one revolution every five or ten minutes. As such mechanism may be of well known form, it need not be illustrated or described in detail herein.

The shaft G carries one or more scraper arms G' in each of the compartments B, B' and $B^2$. Each scraper arm working on one of the compartments B or B', has connected to it a plurality of scraper blades $G^2$ adapted to work "mud" or thickened solid matter accumulating on the bottom wall of the compartment to the periphery of the tray C forming the bottom wall of the compartment, so that as the scraper arm moves past each mud outlet port F' from the compartment, it normally moves mud through said port. As shown, each scraper arm G' is provided at its outer end with a curved scoop blade $G^3$, the free edge of which is adapted to scrape solids off the inner surface of the partition wall D. In the particular construction shown, each scoop blade $G^3$ is a curved integral portion of a metal blade having a straight portion which forms the outer inclined scraper blade $G^2$ carried by the corresponding arm G'.

The scraper arm or arms $G^4$ in the bottom compartment $B^2$ each differ from the arms G' in being inclined upwardly away from the shaft G in conformity with the inclination of the bottom wall of the compartment $B^2$, and each arm $G^4$ carries scraper blades $G^5$ disposed to work mud or thickened solids along the tank bottom wall from the periphery of the tank towards its center, from which a mud offtake pipe H leads.

Advantageously, and as shown, the feed and conditioning compartment includes a set of vertically disposed flocculating arms I, each of which may be connected at its lower end to a corresponding scraper arm G', or to an arm corried by the shaft G and specially provided for the purpose. Advantageously also, the flocculating effect of the agitation of the liquid by the arms I, is supplemented by agitation produced by the velocity at which the liquid to be clarified is supplied through a feed pipe J. One arrangement for this purpose is shown and is characterized by the disposition of the discharge end J' of the feed pipe J, so that the discharge in the compartment B produces an angular movement of the liquid in the compartment opposite in direction to the angular movement of the arms I.

As shown, the shaft G supports a skimmer K adjacent the top wall of the compartment B, which is adapted to work floating impurities into a removal trough K'. The skimmer K and skimmer removal trough K' may be of customary type and form and hence need not be further described.

As shown, clarified liquid is withdrawn from the clarifying compartments B' and B² through drawoff connections which may be of conventional type. As shown, the drawoff connection for each of said compartments includes a pipe ring L of relatively small diameter which surrounds the shaft G and is located adjacent the roof of the compartment in which it is placed, and is formed with a plurality of clarified liquid inlets in its top wall. Each ring L is connected to a corresponding generally horizontal drawoff pipe section L' which may extend through a corresponding feed inlet port E' and thence through the cylindrical tank wall and externally of the latter is connected to a corresponding uprising pipe portion of stand pipe section L². The latter opens at its upper end into a clarified juice receiver L³, and is provided at its upper end with a telescopic section L⁴ or other means customarily provided to effect vertical adjustments of the level at which corresponding drawoff section discharges into the clarified liquid receiver L³.

The tank A may be provided with the usual heat insulation, and with the usual pipe connections for liquidation and washing purposes, but as such features form no part of the present invention and may follow the customary practice of the prior art, they need not be illustrated or described herein. As is plainly apparent from the drawings, the form of construction shown in Figs. 1 and 2 permits of a quiet, direct flow of feed into each clarifying compartment, at a low velocity, and with a desirably wide distribution of the feed into each compartment along the periphery of the latter.

In consequence of the passage of the feed from the flocculating compartment B to the different subjacent clarifying compartments along flow paths which are large enough in cross section to keep the feed velocity desirably low, and are of such direct character as not to give rise to eddy currents in the feed, the floc aggregates formed in the flocculating chamber normally pass through the feed channels and into the clarifying compartments without significant disintegration. The condition of the floc aggregates in the feed entering the clarifying compartments, the wide distribution of the entering feed about the tank axis, the introduction of the feed with its floc content into each clarifying compartment well above its bottom, and the wide separation of the entering feed from the mud discharged from each clarifying compartment, contribute to the attainment of about the maximum possible practical advantage practically obtainable from the conditioning or flocculating action in the compartment B, and ensure efficient sedimentation in each of the clarifying compartments.

In Figs. 3 and 4 we illustrate a form of our invention which in its general operating characteristics is like that shown in Figs. 1 and 2, but is of somewhat simpler and less expensive construction. The cylindrical partition wall D within the tank shown in Figs. 1 and 2, is not used in Figs. 3 and 4, wherein the feed channels EA and sludge channels FA are formed by attaching vertical trough-shaped elements E⁵ and F⁵ to the outer side of the tank wall A. As shown, each of the parts E⁵ and F⁵ is formed by a strip of sheet metal with its edge portions inturned so as to substantially abut radially against the tank wall to which their edges are welded. Each feed channel EA communicates through ports E⁶ in the tank wall with the compartments B, B' and B² at substantially the same levels at which the feed channels communicate with said compartment in the construction shown in Figs. 1 and 2.

The form of construction shown in Figs. 3 and 4 practically requires the angular extent of the feed channels to be substantially less than in the construction first described. To minimize the undesirable effect, on the clarifying operations in the compartments B' and B² of Figs. 3 and 4, of the higher velocity at which the feed is introduced, we advantageously place at the inner side of each feed inlet port E⁶ an arcuate baffle E⁷ of substantially greater angular extent about the tank axis than said port E⁶. The baffle E⁷, which may be suspended from the roof of the compartment in which the baffle is placed, is spaced from the roof and from the tank wall to permit the feed to pass away from the baffle at its top, bottom and end edges. The sludge channels FA of Figs. 3 and 4 may be, and are shown, as similar in proportions and in the form of their inner walls to the channels F of Figs. 1 and 2. Except in respect to the features noted above, the clarifier shown in Figs. 3 and 4, may be similar in construction and operation to the clarifier shown in Figs. 1 and 2. While with the construction shown in Figs. 3 and 4, it is not practically feasible to employ feed channels as large in cross section as is practically possible with the construction shown in Figs. 1 and 2, nevertheless, the construction shown in Figs. 3 and 4 permits the feed channels to be relatively large in cross section in comparison with the feed channels of clarifiers now in extensive use.

As previously explained, important practical advantages may be obtained by providing a multitray clarifier with mud discharge channels which are separate from one another as well as from the feed channels, and which discharge into the mud thickening space in the lower compartment of the clarifier at levels which are adjusted to regulate the relative amounts of feed passed into different clarifying compartments and the relative density of the muds withdrawn from those compartments. In Figs. 5 and 6, we illustrate a clarifier which includes such regulable mud discharge connections, but which is otherwise like the clarifier shown in Figs. 1 and 2.

The clarifier shown in Figs. 5 and 6 includes a separate sludge channel FB for each of the compartments B and B'. As shown, the different sludge channels FB (five as shown) are arranged in a series about the tank axis and alternate with feed channels EB. The channels FB and EB are formed as are the sludge channels F and feed channels E of Figs. 1 and 2, by a cylindrical partition wall D and radial partition walls D'. Each feed channel EB communicates with each of the compartments B, B' and B² as do the channels E of Figs. 1 and 2. Each sludge channel FB communicates with the single compartment B or B' which it serves through a port F" and may be enlarged adjacent and below said port exactly as each of the channels of Figs. 1 and 2 is enlarged adjacent each of its inlet ports F".

As previously explained, the provision of an individual sludge conduit for each of the compartments B and B', permits of regulation of the density of the mud or sludge accumulating on the bottom wall of each of those compartments, by varying the level at which the mud passes from the sludge channel into the lower mud thickening space in the compartment B². As will be apparent, the means provided for regulating the discharge level may take various forms. In the simple form shown, the portion of the wall D forming the inner wall of the lower portion of each sludge channel FB terminates at a level above that of the corresponding side wall portions D' of the channel, and a sliding valve extension of the inner wall is formed by a metal plate M. The latter is shown as of rectangular outline, and normally bears against the outer side of the inner wall portion D of the channel, and extends between the side walls D' of the channel.

As shown, the valve M may be vertically adjusted by means of a rod N welded at its lower end to the plate M and extending upward through the top wall of the tank A and having its upper end in threaded engagement with a nut N' seated on a cover plate O for an opening in the top wall through which the valve member M may be removed when necessary. As shown, the sludge channels FB are extended to the top of the tank.

Provisions are advantageously made for normally keeping each valve member M in proper contact with the inner wall of the corresponding sludge channel. As shown, the provisions for the purpose comprise a rivet-like projection M' from the innerside of the valve M which has its body portion received in a slot $D^{10}$, formed in the wall D and has its head overlapping that portion of the wall D adjacent the slot $D^{10}$. The latter is open at its lower end, so that by lowering the valve member below its normal range of adjustment, the rivet may be moved out of the slot. The valve member M is thus freed for movement up through and out of the sludge channel.

As has been made apparent, in the clarifier shown in Figs. 5 and 6, the separate control of the removal of clarified liquid and of mud from each of the similar clarifying compartments B', permits each of those compartments to be operated with full and equal efficiency. That operating result is not attainable with any prior multitray clarifier known to us.

While in accordance with the provisions of the statutes, we have illustrated and described the best forms of embodiment of the invention now known to us, it will be apparent to those skilled in the art that changes may be made in the form of the apparatus disclosed without departing from the spirit of the invention as set forth in the appended claims and that in some cases certain features of our invention may be used to advantage without a corresponding use of other features.

Having now described the invention, what we claim as new and desire to secure by Letters Patent, is:

1. In a multitray clarifier, a plurality of superposed clarifying compartments each having a peripheral wall formed with a feed inlet port and with a mud outlet port laterally displaced from said inlet port, means for supplying liquid to be clarified to each of said inlet ports comprising a feed chamber above said compartments and holding a body of said liquid and feed distribution means external to said compartments and connecting said chamber to said inlet ports and providing an unthrottled flow path for gravitational flow of said liquid out of said chamber and directly therefrom to each of said inlet ports, means for withdrawing clarified liquid from said compartments comprising a separate regulable outflow channel for each compartment which has its inlet end connected to said compartment at one level and has its discharge end at a different level, the discharge ends of all of said outflow channels being vertically displaced in the same direction from each of said mud outlet ports, and mud discharge means providing a separate mud discharge channel for each compartment having its inlet end connected to and receiving mud from the outlet port of said compartment and having its discharge end vertically displaced from said outlet port, the discharge ends of all of said mud discharge channels being vertically displaced in the same direction from each of said mud outlet ports.

2. A multitray clarifier as specified in claim 1, in which the feed inlet port for each clarifying compartment opens to the upper portion of the latter.

3. In a multitray clarifier, a plurality of superposed clarifying compartments having a common peripheral wall formed with a feed inlet port for each compartment and with a mud outlet port for each compartment laterally displaced from said inlet port, and means providing vertical feed and mud channels at the outer side of said wall, each of said feed channels communicating with one of said inlet ports and each of said mud channels communicating with one of said mud outlet ports, means for supplying liquid to be clarified to said feed channels, and means for withdrawing mud from said mud channels.

4. A clarifier as specified in claim 3, in which the said channels are arranged edge to edge in a series extending around said compartment.

5. A multitray clarifier comprising a lower mud thickening compartment and a series of clarifying compartments superposed above said thickening compartment, and a separate mud discharge conduit for each superposed clarifying compartment extending downward into the thickening compartment and having an outlet opening into the latter at a level which is below all of said clarifying compartments, the clarifying compartments which are at successively lower levels having the outlets for their respective mud discharge conduits at successively lower levels, means for supplying liquid to be clarified comprising a feed chamber above said clarifying compartments and holding a body of said liquid and feed distribution means external to said compartments and connecting said chamber to each of said clarifying compartments and providing an unthrottled flow path for gravitational flow of said liquid out of said chamber and directly therefrom into each of said clarifying compartments, and means for withdrawing clarified liquid from said compartments comprising a separate regulable outflow channel for each compartment which has its inlet end connected to said compartment at one level and has its discharge end at a different level, the discharge ends of all of said outflow channels being vertically displaced in the same direction from the bottom of each of said clarifying compartments.

6. A multitray clarifier comprising a lower mud thickening compartment and a series of clarifying compartments superposed above said thickening compartment, a separate mud discharge conduit for each superposed clarifying compartment extending downward into the thickening compartment, and means for varying the level at which each of said conduits opens into said thickening compartment.

7. A multitray clarifier comprising a lower mud thickening compartment and a series of clarifying compartments superposed above said thickening compartment, a separate mud discharge conduit for each superposed clarifying compartment extending downward into the thickening compartment, and means for adjusting the relative levels at which the different mud discharge conduits open to said thickening compartment.

8. A multitray clarifier comprising a lower mud thickening compartment, a series of clarifying compartments superposed above said thickening compartment, a feed chamber above said clarifying compartments holding a body of said liquid and feed distribution means external to said compartments providing an unthrottled flow path for gravitational flow of said liquid out of said chamber and directly therefrom into each of said compartments, means for withdrawing clarified liquid from said compartments comprising a separate regulable outflow channel for each compartment which has its inlet end connected to said compartment at one level and has its discharge end at a different level, the discharge ends of all of said outflow channels being vertically displaced in the same direction from the bottom of each of said clarifying compartments, and mud discharge means providing a separate mud discharge channel for each clarifying compartment which has its inlet end connected to and receiving mud from that compartment at one level and has its discharge end at a different level, the discharge ends of all of said mud discharge channels being vertically displaced in the same direction from the bottom of each of said clarifying compartments.

9. In clarifying liquid in superposed compartments, the method which consists in separately discharging solids settling on the bottom walls of the different compartments through separate flow paths opening at different levels into a common mud thickening space below the lowermost of said compartments, and regulating the rates at which the solids are separately discharged through said separate flow paths by regulating the withdrawal of thickened mud from said space and thereby varying the mud densities in said space at said different levels, and passing liquids to be clarified directly into each of said compartments from a supply body of said liquid above the uppermost of said compartments by gravitational flow along an unthrottled flow path, and withdrawing clarified liquid from each of said compartments along a separate flow path individual to that compartment and having its inlet end in communication with that compartment at one level and having its outlet end at a higher level and varying the last mentioned level to thereby vary the rate at which clarified liquid is withdrawn from the last mentioned compartment.

10. In the clarification of liquid in superposed clarifying compartments, the method which consists in withdrawing clarified liquid from the upper portion of each compartment at a rate which is regulable and independent of the rate at which clarified liquid is withdrawn from the other clarifying compartments and in withdrawing mud from each compartment at a rate which is regulable and independent of the rate at which the mud is withdrawn from the other clarifying compartments, and passing liquid to be clarified to said compartments from a body of said liquid above said compartments by gravitational flow directly into each compartment along an unthrottled flow path and at a rate equal to the sums of the rates at which clarified liquid and mud are withdrawn from that compartment.

11. In a multitray clarifier, the combination with an external tank wall, of an internal wall separated from the external wall by an annular space and surrounding a central space, horizontally disposed partitions dividing said central space within said inner wall into a plurality of superposed compartments, radial partitions separating said annular space into a plurality of separate vertically disposed feed and mud discharge channels, said inner wall being formed with ports opening from the uppermost compartment into the upper ends of said feed channels and with ports through which the feed channels open to the different compartments beneath said uppermost compartment and with ports through which each compartment opens into at least one of the mud discharge channels, each of the latter having a discharge outlet in the lower portion of the lowermost compartment, means for supplying liquid to be clarified to said uppermost compartment, means for moving mud accumulating on the partitions forming the bottom walls of said compartments, to their respective mud outlet ports, means for withdrawing clarified liquid from the compartments beneath said uppermost compartment, and means for withdrawing mud from the bottom compartment.

12. A multitray clarifier as specified in claim 7, in which the said relative level adjusting means comprises an adjustable member at the lower end of one of said conduits and forming a bottom portion of the wall of said conduit and means extending through said conduit for adjusting said member.

13. A multitray clarifier as specified in claim 7, in which one of said mud discharge conduits has a wall comprising a fixed lower portion, and an adjustable member which also forms a part of the said relative level adjusting means and which is detachably associated with said lower wall portion, and in which said level adjusting means also comprises means extending through said conduit and adjustable to adjust said member, and to detach it from said wall portion and remove it through said conduit.

14. A multitray clarifier as specified in claim 7, in which one of said mud discharge conduits has a wall including an adjustable member which constitutes a part of the relative level adjusting means, which by its adjustment, varies the level at which said conduit opens into said thickening compartment.

15. In the clarification of liquid in superposed clarifying compartments, the method which consists in passing liquid to be clarified directly into each of said compartments from a supply body of said liquid above the uppermost of said compartments by gravitational flow along an unthrottled flow path, and withdrawing clarified liquid from each of said compartments along a separate flow path individual to that compartment and having its inlet end in communication with that compartment at one level and having its outlet end at a higher level and varying the last mentioned level to thereby vary the rate at which clarified liquid is withdrawn from the last mentioned compartment and withdrawing mud from the lower portion of each compartment at a rate regulated to maintain the mud so withdrawn at a density which is predetermined and independent of the density of the mud withdrawn from each other compartment.

16. In the clarification of liquid in superposed clarifying compartments, the method which consists in passing liquid to be clarified directly into each of said compartments from a supply body of said liquid above the uppermost of said compartments by gravitational flow along an unthrottled flow path, and withdrawing clarified liquid from each of said compartments along a separate flow path individual to that compartment and having its inlet end in communication with that compartment at one level and having its outlet end at a higher level and varying the last mentioned level to thereby vary the rate at which clarified liquid is withdrawn from the last mentioned compartment, and separately withdrawing mud from the lower portions of the different compartments at rates relatively regulated for the withdrawal of mud of substantially the same density from each of the different compartments.

PHILIP M. McHUGH.
WILLIAM C. WEBER.